April 8, 1958     J. B. KUIPERS     2,829,521
GYROSCOPIC STRUCTURE
Filed Oct. 22, 1954
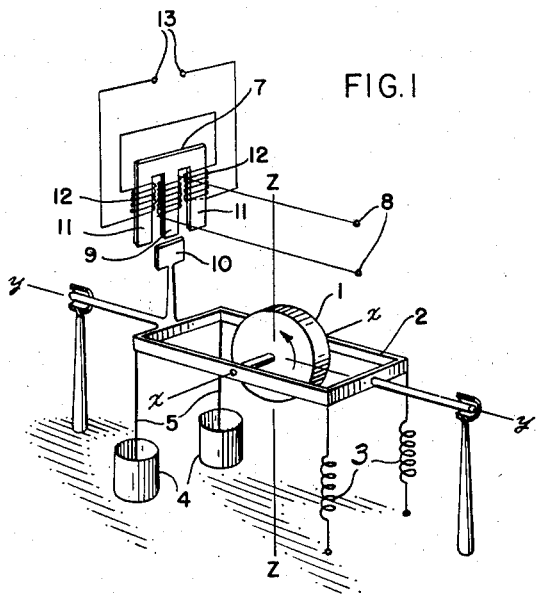
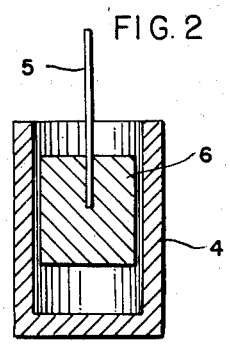
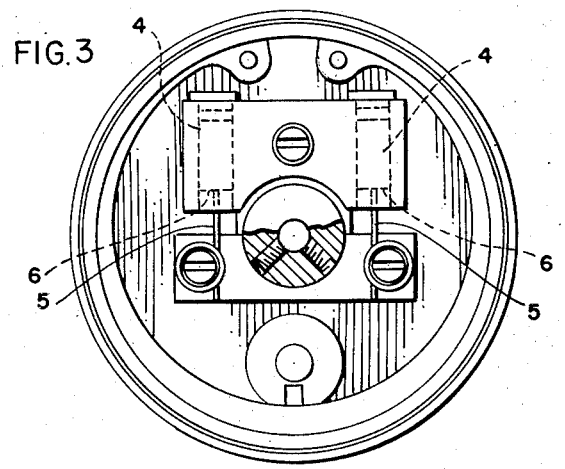
*INVENTOR:*
JACK B. KUIPERS
BY
Marshall, Johnston, Cook & Root
ATT'YS

United States Patent Office 2,829,521
Patented Apr. 8, 1958

2,829,521

GYROSCOPIC STRUCTURE

Jack B. Kuipers, Grand Rapids, Mich., assignor to R. C. Allen Business Machines, Inc., Grand Rapids, Mich., a corporation of Michigan Application October 22, 1954, Serial No. 464,047

9 Claims. (Cl. 74—5.5)

This invention relates to gyroscopes and more particularly to means for damping resonant oscillations in a gimbal structure of a miniature gyroscope for indicating the rate of turn of an airplane or the like.

A gyroscope for indicating a rate of turn includes a member adapted to rotate rapidly about a spin axis, and a gimbal structure for supporting the rotary member about its spin axis. The gimbal is pivotally supported about an output axis which lies at right angles to the spin axis, and is restrained from turning about its output axis by a means such as springs. Any turning of the gimbal about its output axis causing a deviation from its normal positioning, is representative of gyroscopic force which corresponds to a rate of turn of the entire structure about an input axis which is mutually perpendicular to both the spin axis and the output axis. The turn rate of an airplane or the like in which the gyroscope is mounted may therefore be measured by means responsive to the deviation of the gimbal against its restraining springs.

The gimbal, being pivotally mounted and restrained by springs, will have a natural or resonant frequency of oscillation about its output axis. The resonance of the gimbal would contribute to instability in the gyroscope and in the control system in which the gyroscope was operating, and, therefore, it is essential that the resonant oscillation be suppressed.

Heretofore, the damping of resonant oscillation in the gimbal has been accomplished by placing an external frame structure in close proximity to the gimbal structure and by providing a viscous medium which will caused to shear between the structures. It was necessary that the gimbal and the frame structure be fitted together with close tolerances to develop proper shearing in the viscous medium between them. A further disadvantage in such a structure is that the viscosity of the medium would vary considerably with variance in temperature and therefore the permissible operating temperatures of the gyroscope would be limited.

The gyroscope of this invention includes a pair of dash-pots, or cylinder pistons, which are mounted on the frame structure of the gyroscope. Motion of the gimbal about its axis is translated to the pistons by a pair of flexible connecting rods which are rigidly attached both to the gimbal and to the pistons.

It is an object of this invention to provide an improved miniature gyroscope which is light in weight and is economical to manufacture.

A further object of this invention is to provide a gyroscope with improved means for damping resonant oscillation in its gimbal.

It is a further object of this invention to provide a method of bonding the flexible connecting rods into the material composing the pistons.

It is a further object of this invention to provide dashpots which are self-compensating for variance in temperature and which are economical to manufacture.

A more complete understanding of the present invention, its mode of operation and its advantages may be gathered from the specification, together with an inspection of the accompanying drawing, in which:

Fig. 1 is a pictorial view of an elementary gyroscope in schematic form illustrating this invention;

Fig. 2 is a sectional view illustrating the dash-pots and the manner in which each flexible connecting rod is bonded to the thermoplastic piston; and Fig. 3 shows an end view of a gyroscope instrument embodying the principles of this invention.

The gyroscope of the present invention comprises a rotating member 1 which is mounted to rotate about a spin axis $x$—$x$. A gimbal structure 2 supports the rotating member 1 about its spin axis and is in turn rotatably supported about an output axis $y$—$y$. A pair of springs 3 is connected between the gimbal structure 2 and the fixed frame of the gyroscope, and functions to restrain the gimbal 2, tending to hold it in a normal, horizontal position. The gimbal 2, restrained by the springs 3, has a resonant period oscillation about the axis $y$—$y$.

A pair of dash-pots 4 are fixedly mounted on the frame of the gyroscope structure and have flexible connecting rods 5 attached to the structure of the gimbal 2. The dash-pots 4 each contain a piston 6 which will be caused to move as the gimbal pivots about the axis $y$—$y$. The dash-pots operate in a viscous medium and thereby offer a restraining force which tends to hold the gimbal from moving, and, therefore, damps out the resonant oscillation.

If the entire structure of the gyroscope turns about an input axis $z$—$z$ which is mutually at right angles to the spin axis $x$—$x$ and to the gimbal axis $y$—$y$, then a force will appear to rotate the gimbal. Under the influence of this gyroscopic force the gimbal will deviate slightly from its normal position, stretching one of the springs 3 and compressing the other. The dash-pots 4 will then damp any oscillation which would tend to occur and permit the gimbal structure 2 to assume a new stable position corresponding to the rate of turn about the input axis $z$—$z$.

A variable reluctance pick-up 7 (shown schematically in Fig. 1) will indicate the amount of deviation of the gimbal from its normal position. An alternating current impressed upon input terminals 8 of the reluctance pick-up causes an alternating flux in a center arm 9 of the reluctance pick-up. In a normal position of the gimbal a pick-up armature 10 lies directly opposite the center arm 9 and provides equal magnetic paths into two side arms 11; and alternating voltages induced in secondary windings 12 have equal and opposite effects and cancel each other, thereby producing a zero output voltage at terminals 13.

A deviation of the gimbal causes a displacement of the armature 10, thereby causing the alternating magnetic field to be distored and to introduce unequal voltages in the secondary windings 12. Because of the unequal voltages, complete cancellation does not occur, and a difference voltage appears at the output terminals 13. The relative polarity of the output voltage appearing at the terminals 13 is representative of the direction of the gimbal deviation.

In a well designed rate gyroscope, the amount of deviation of the gimbal structure from its normal position may be restricted to two or three degrees of rotation. The corresponding movement of the piston in each dash-pot may be only a few thousandths of an inch. The method of attaching the piston to the gimbal is of utmost importance since any play or backlash in the linkage system would be a large percentage of the total piston excursion. To circumvent the difficulties of such a linkage system, the pistons may be rigidly attached to the gimbal by means of small flexible rods such as spring steel wires. This arrangement gives columnar rigidity for moving the piston in accordance with the gimbal rotation and at the same time it provides the necessary compliance which is transverse to the motion of the piston.

Each dash-pot provides a restraining force to the motion of the gimbal by forcing a piston to move in a cylinder containing a viscous medium. To provide a constant restraint for a wide range of temperatures, it is desirable that the piston and the cylinder be composed of materials having different coefficients of expansion. It has been found that a metal cylinder of steel or brass in combination of a piston of a thermoplastic resinous material, such as nylon, will be satisfactory. Nylon has a greater expansion coefficient than the brass or steel, and, therefore, a piston will fit more snugly into the cylinder at high temperatures than it will at low temperatures. This will tend to develop a greater restraining force at high temperatures because the viscous medium must then flow past the piston in the more limited clearance space. On the other hand, a common medium, such as oil, tends to decrease in viscosity as the temperatures increase, tending to cause a less restraining force upon movement of the piston. By properly designing the nylon piston and the steel or brass cylinder, the restraining force can be held relatively constant over a wide range of temperatures because the expansion characteristics of the piston will compensate for the viscosity characteristics of the oil.

To bond the spring steel piston rods 5 into the nylon pistons 6, it has been found that each rod 5 may be rotated relative to its nylon piston 6 and gradually pressed into the piston while rotating. Heat generated by friction serves to melt the nylon and permit the rod 5 to penetrate into the piston 6. When the rod has penetrated to the proper depth, the rotation is stopped, and the nylon thereupon freezes securely to the rod. The bonding accomplished by this method has been found to be so great that the rod 5 may not be subsequently separated from the piston 6 without materially damaging the piston.

It will be appreciated that the rotation between the rod and the piston is relative one to the other, and that the same result could be accomplished if the rod was stationary and the piston rotated.

Changes may be made in the form, construction and arrangement of the parts without departing from the spirit of the invention or sacrificing any of its advantages, and the right is hereby reserved to make all such changes as fall fairly within the scope of the following claims.

What is claimed is:

1. Apparatus for damping oscillations in a gimbal of a gyroscope, said apparatus comprising a dash-pot including a thermoplastic piston within a metallic cylinder, said piston having a coefficient of expansion which is substantially greater than the coefficient of expansion of said cylinder, a flexible rod having an end bonded to the piston and another end rigidly attached to the gimbal of the gyroscope, the flexible rod being operative to transmit motion from the gimbal to the cylinder of the dash-pot.

2. Apparatus for damping oscillations in a gyroscope, said apparatus comprising a cylinder and a piston therein, said cylinder being mounted on a stationary member of the gyroscope, and means for coupling said piston to a gimbal member of the gyroscope, said coupling means being a flexible rod having one end rigidly fixed to the piston and the other end rigidly fixed to the gimbal member, said piston being of material having a greater coefficient of expansion than the cylinder, said piston and cylinder cooperating within a viscous medium to develop a constant restraint to motion of said gimbal member throughout a relatively great range of operating temperatures.

3. Apparatus for damping oscillations in a gimbal of a gyroscope, said apparatus comprising a dash-pot having a nylon piston, a flexible metal rod having one end bonded to the nylon piston and the other end rigidly fastened to the gimbal of the gyroscope, said metal rod being operative to transmit motion from the gimbal to the nylon piston of the dash-pot.

4. In a gyroscope, apparatus for damping oscillations of a gimbal, said apparatus comprising a pair of dash-pots symmetrically disposed about the axis of the gimbal, each of the dash-pots having a nylon piston, each of the nylon pistons being bonded to a flexible rod, each of the flexible rods being rigidly attached to the gimbal, the flexible rods having sufficient columnar rigidity to translate rotary motion of the gimbal into linear motion of the pistons.

5. Apparatus for damping oscillations in a gimbal of a gyroscope, said apparatus comprising a metal cylinder enclosing a nylon piston and a rod coupling the piston to the gimbal, said rod having one end rigidly fastened to the gimbal and having the other end penetrating into and frozen to the nylon of the piston, said rod having columnar rigidity for transferring motion from the gimbal to the piston and having flexibility for permitting transverse compliance between the gimbal and the piston.

6. Apparatus for damping oscillations in a gimbal of a gyroscope, said apparatus comprising a dash-pot including a nylon piston within a metal cylinder, a flexible rod for coupling said piston to said gimbal, said rod being rigidly fastened to the gimbal and being bonded into the nylon piston by rotation of said rod relative to the piston while pressing said rod into said piston and by stopping said rotation and allowing the nylon of the piston to freeze to the rod.

7. A method of bonding a rod into a thermoplastic piston for a damping dash-pot of a gyroscope, said method comprising aligning the rod and said piston along a common axis, rotating said rod with respect to the piston while pressing the rod into the piston, stopping said rotation and permitting the thermoplastic of the piston to freeze to the rod.

8. A method of bonding a rod member into a thermoplastic synthetic resin member comprising rotating one of said members with respect to the other while pressing said members together thereby causing said rod member to penetrate into said thermoplastic synthetic resin member, and stopping the rotation and permitting the thermoplastic to freeze to the rod.

9. A method of bonding a spring steel rod into a nylon piston comprising positioning the rod axially along the axis of the piston, rotating the rod with respect to the piston while pressing the rod into the piston, and stopping the rotation and allowing the nylon of the piston to freeze to the rod.

References Cited in the file of this patent

UNITED STATES PATENTS

| 1,407,320 | Bouche | Feb. 21, 1922 |
| 1,880,994 | Sperry | Oct. 4, 1932 |
| 2,345,169 | Wunsch | Mar. 28, 1944 |

FOREIGN PATENTS

| 387,366 | Great Britain | Jan. 30, 1933 |
| 145,018 | Sweden | Apr. 27, 1954 |